United States Patent

Hyodo et al.

[11] Patent Number: 5,816,287
[45] Date of Patent: Oct. 6, 1998

[54] APPARATUS FOR PREVENTING DISCHARGE OF FUEL VAPOR

[75] Inventors: Yoshihiko Hyodo; Hiroki Matsuoka, both of Susono, Japan

[73] Assignee: Toyota Jidosha Kabushiki Kaisha, Toyota, Japan

[21] Appl. No.: 610,060

[22] Filed: Feb. 29, 1996

[30] Foreign Application Priority Data

Apr. 12, 1995 [JP] Japan .................................. 7-086738

[51] Int. Cl.$^6$ ............................................. F02M 33/02
[52] U.S. Cl. .......................................... 137/587; 123/519
[58] Field of Search .................... 137/587, 588; 123/516, 519, 520

[56] References Cited

U.S. PATENT DOCUMENTS

| | | | |
|---|---|---|---|
| 3,749,124 | 7/1973 | Andres | 137/587 |
| 4,659,346 | 4/1987 | Uranishi et al. | 55/182 |
| 4,714,172 | 12/1987 | Morris | 220/86.2 |
| 4,815,436 | 3/1989 | Sasaki et al. | 123/520 |
| 4,869,283 | 9/1989 | Oeffling et al. | 137/43 |
| 4,872,439 | 10/1989 | Sonoda et al. | 137/588 X |
| 5,054,520 | 10/1991 | Sherwood et al. | 137/587 |
| 5,067,468 | 11/1991 | Otowa et al. | 123/520 |
| 5,123,459 | 6/1992 | Toshihiro | 137/587 X |
| 5,243,944 | 9/1993 | Blumenstock | 123/520 |
| 5,263,511 | 11/1993 | Ohasi et al. | 137/588 |
| 5,277,168 | 1/1994 | Kondo et al. | 123/519 |

FOREIGN PATENT DOCUMENTS 60-023501  7/1985  Japan .

*Primary Examiner*—John Rivell
*Attorney, Agent, or Firm*—Cushman Darby & Cushman IP Group of Pillsbury Madison & Sutro LLP

[57] ABSTRACT

An apparatus for preventing discharge of fuel vapor has a differential pressure valve. Before a fuel tank opens to the atmosphere due to removal of a fuel cap, the apparatus leads fuel vapor in the lower pressure chamber of the differential pressure valve to a canister for processing therein and opens the differential pressure valve to lead fuel vapor in the fuel tank to the canister for processing therein. The fuel tank is connected to the canister via the differential pressure valve. The lower pressure chamber of the differential pressure valve is connected to the canister via a connection pipe, a communication valve, and a connection pipe. When a fuel lid is opened, the communication valve is opened to lead fuel vapor in the lower pressure chamber of the differential pressure valve to the canister. At this time, a pressure difference is produced between the lower pressure chamber and the high pressure chamber of the differential pressure valve, so that the differential pressure valve is opened to lead fuel vapor in the fuel tank to the canister for processing therein.

20 Claims, 6 Drawing Sheets

ABSTRACT

APPARATUS FOR PREVENTING DISCHARGE OF FUEL VAPOR

BACKGROUND OF THE INVENTION

1. Field of the Invention

The present invention relates to an apparatus for preventing discharge of fuel vapor from a vehicle fuel tank during refueling, and more particularly to an apparatus for preventing discharge of fuel vapor in which a differential pressure valve is used to open and close a passage connecting a fuel tank and a canister.

2. Description of the Related Art

Japanese Utility Model Application Publication No. 60-23501 discloses a technique to prevent discharge of fuel vapor from a vehicle fuel tank during refueling. In this technique, when the fuel supply inlet of the fuel tank is opened to the atmosphere, an open/close valve is opened, so that fuel vapor is sucked by a negative pressure tank during refueling, thereby preventing the fuel vapor from being discharged to the atmosphere.

In this technique, however, when refueling is performed when the passage between the fuel tank and the negative pressure tank is closed due to a malfunction of an electromagnetic valve used as the open/close valve, there is no place to which fuel vapor can flow. In this case, the inside pressure of the fuel tank increases as the level of the fuel in the fuel tank increases, whereby the fuel vapor or liquid fuel in the fuel tank is jetted from the fuel supply inlet and thereby discharged to the atmosphere. This causes air pollution.

U.S. Pat. No. 4,714,172 discloses an improved technique which can solve the above-described drawback. In this technique, a differential pressure valve which opens in response to a pressure difference is used as an open/close valve for preventing discharge of fuel vapor to the atmosphere. The differential pressure valve is simpler, more reliable, and less expensive than an electromagnetic valve.

In this technique, as shown in FIG. 6, a vehicle fuel tank 110 is connected to a canister 116 via a differential pressure valve 118. The inside of the differential pressure valve 118 is divided into a lower pressure chamber 118$a$ and a higher pressure chamber 118$b$ by a diaphragm 118$d$. The lower pressure chamber 118$a$ is connected to an inlet pipe 112 via a passageway 122 at a position in the vicinity of the fuel supply port, while the higher pressure chamber 118$b$ is connected to the fuel tank 110 via a passageway 123.

When a fuel cap 114 is attached, the pressure in the lower pressure chamber 118$a$ is the same as that in the higher pressure chamber 118$b$. Therefore, the differential pressure valve 118 is closed due to the elastic force of a spring 125, so that the passageway connecting the fuel tank 110 and the canister 116 is shut off.

When a fuel cap 114 is removed for refueling or the like, the pressure in the lower pressure chamber 118$a$ decreases from a high pressure (tank-internal pressure) to a lower pressure (atmospheric pressure), and the pressure in the higher pressure chamber 118$b$ decreases later than that in the lower pressure chamber 118$a$. The differential pressure valve 118 opens due to the pressure difference between the lower pressure chamber 118$a$ and the higher pressure chamber 118$b$ which is produced at the beginning of the operation of removing the fuel cap 114.

During refueling, the pressure in the lower pressure chamber 118$a$ is maintained low (at the atmospheric pressure) because the lower pressure chamber 118$a$ communicates with the inlet pipe 112 in the vicinity of the fuel supply port. In the meantime, a positive pressure is developed in the higher pressure chamber 118$b$ as the level of fuel increases during refueling. The differential pressure valve 118 remains open due to the pressure difference between the lower pressure chamber 118$a$ and the higher pressure chamber 118$b$.

Fuel vapor produced in the fuel tank 110 is led to the canister 116 via the passageway connecting the fuel tank 110 and the canister 116, and is adsorbed by activated charcoal or the like in the canister 116. With this operation, the fuel vapor is prevented from being discharged to the atmosphere.

In this conventional technique, the lower pressure chamber is filled with fuel vapor because the lower pressure chamber of the differential pressure valve is connected to the inlet pipe of the fuel tank at a position in the vicinity of the fuel supply port. Therefore, the pressure in the lower pressure chamber of the differential pressure valve is higher than the atmospheric pressure. The pressure difference for opening the differential pressure valve is obtained by releasing the pressure in the lower pressure chamber of the differential pressure valve which is higher than the atmospheric pressure when the fuel cap is removed. Accordingly, the conventional technique has the problem that fuel vapor present in the lower pressure chamber is discharged to the atmosphere through the fuel supply port.

SUMMARY OF THE INVENTION

The present invention has been accomplished in view of the forgoing problems, and an object of the present invention is to provide an apparatus for preventing discharge of fuel vapor which can apply a pressure difference to a differential pressure valve, without releasing the pressure of the lower pressure chamber thereof, so as to open the differential pressure valve, thereby leading fuel vapor produced in a fuel tank to a canister during refueling for processing therein.

The present invention provides an apparatus for preventing discharge of fuel vapor which includes a fuel tank for a vehicle, a fuel cap for closing the fuel tank in a sealed manner, a canister for processing fuel vapor produced in the fuel tank, a fuel vapor introducing passageway for connecting the fuel tank and the canister, and a differential pressure valve disposed in the middle of the fuel vapor introducing passageway so as to open and close the fuel vapor introducing passageway. The lower pressure chamber of the differential pressure valve is connected to the fuel tank at a position in the vicinity of the fuel supply port thereof, and the high pressure chamber of the differential pressure valve is connected to the fuel tank. The apparatus further includes a purge passageway connecting the lower pressure chamber of the differential pressure valve and the canister, a communication valve disposed in the middle of the purge passageway and adapted to selectively open the purge passageway, and a communication enabling member for opening the communication valve, before the fuel tank opens to the atmosphere due to removal of the fuel cap, thereby establishing communication through the purge passageway.

Before the fuel supply port of the fuel tank is opened to the atmosphere, the communication valve is opened by a communication enabling member so as to open the purge passageway. As a result, fuel vapor in the lower pressure chamber of the differential pressure valve is led to the canister via the purge passageway, and a pressure difference is produced between the lower pressure chamber and the higher pressure chamber of the differential pressure valve, so that the differential pressure valve is opened to establish communication through the fuel vapor introducing passageway, thereby leading fuel vapor produced in the fuel tank to the canister.

The above and other objects, features, and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
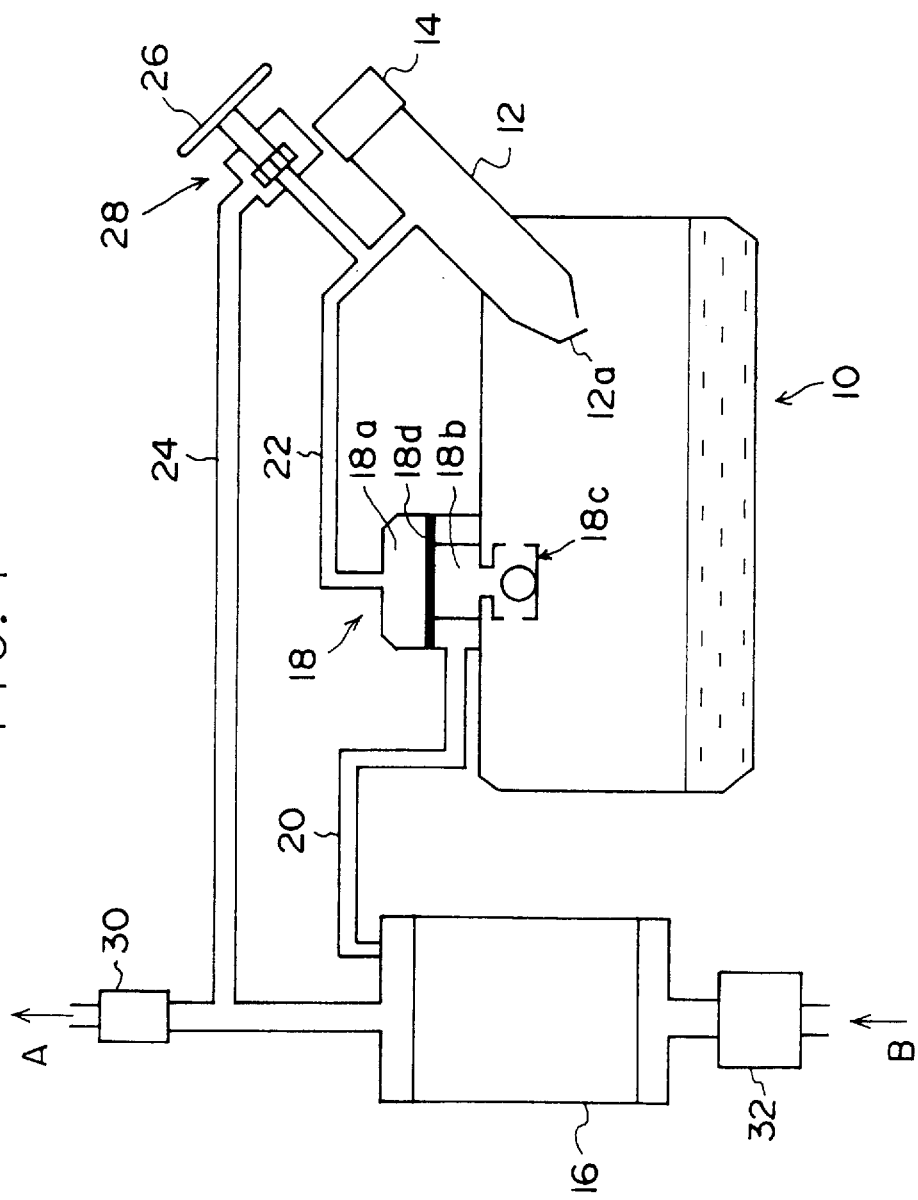
FIG. 1 is a schematic illustration showing a fuel vapor discharge preventing apparatus according to a first embodiment of the present invention.
Figure 2:
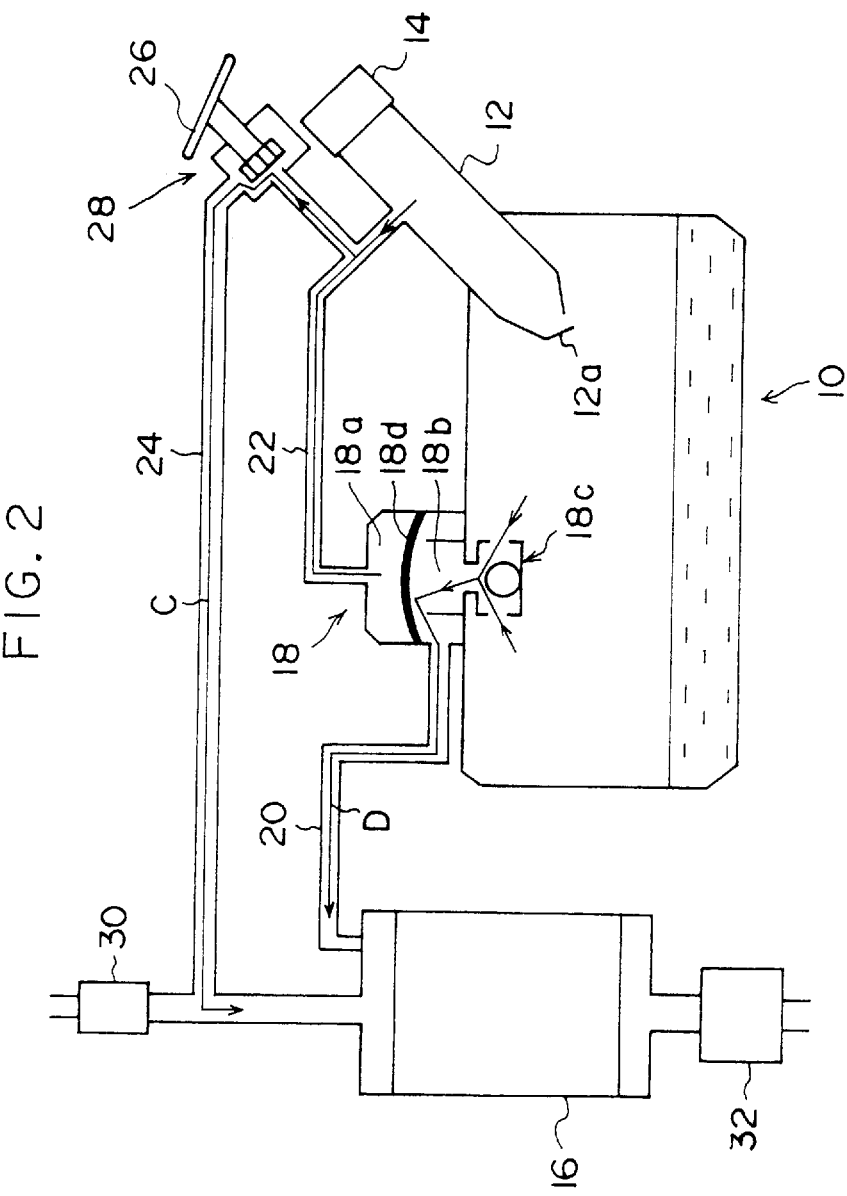
FIG. 2 is a schematic illustration corresponding to FIG. 1 and showing the operation when a fuel lid is opened.
Figure 3:
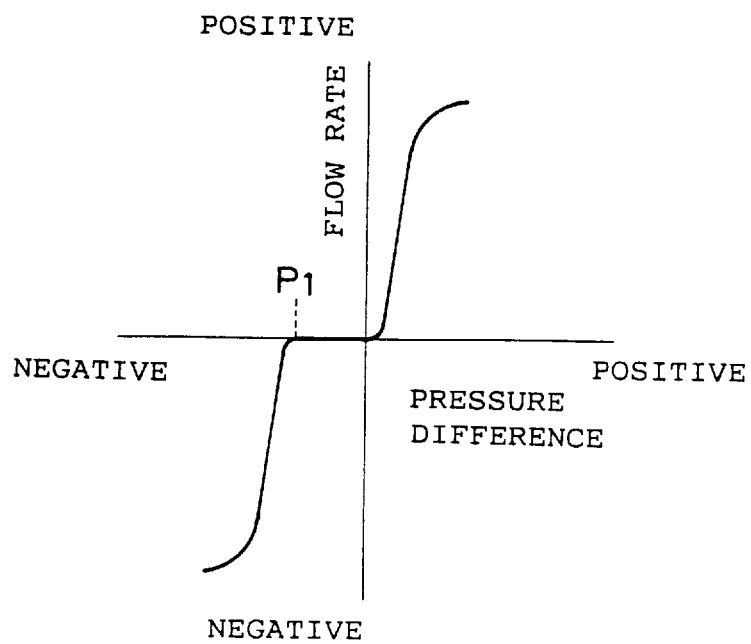
FIG. 3 is a graph showing the flow characteristic of an atmospheric valve used in the first embodiment.
Figure 4:
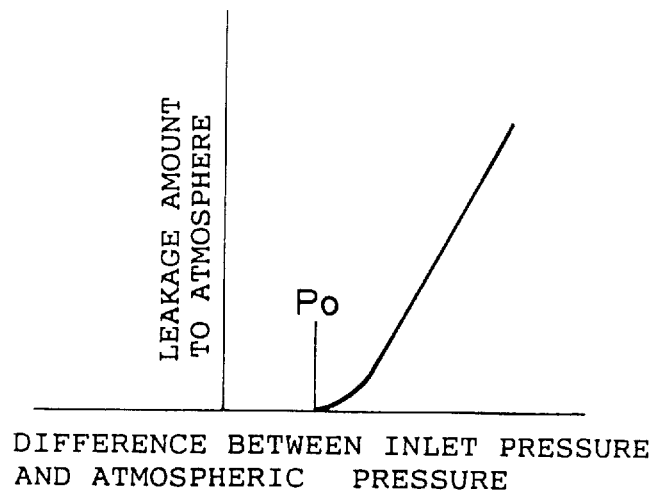
FIG. 4 is a graph showing the relationship between the pressure difference between the internal pressure of an inlet pipe and the atmospheric pressure and the amount of leakage of fuel vapor.
Figure 5:
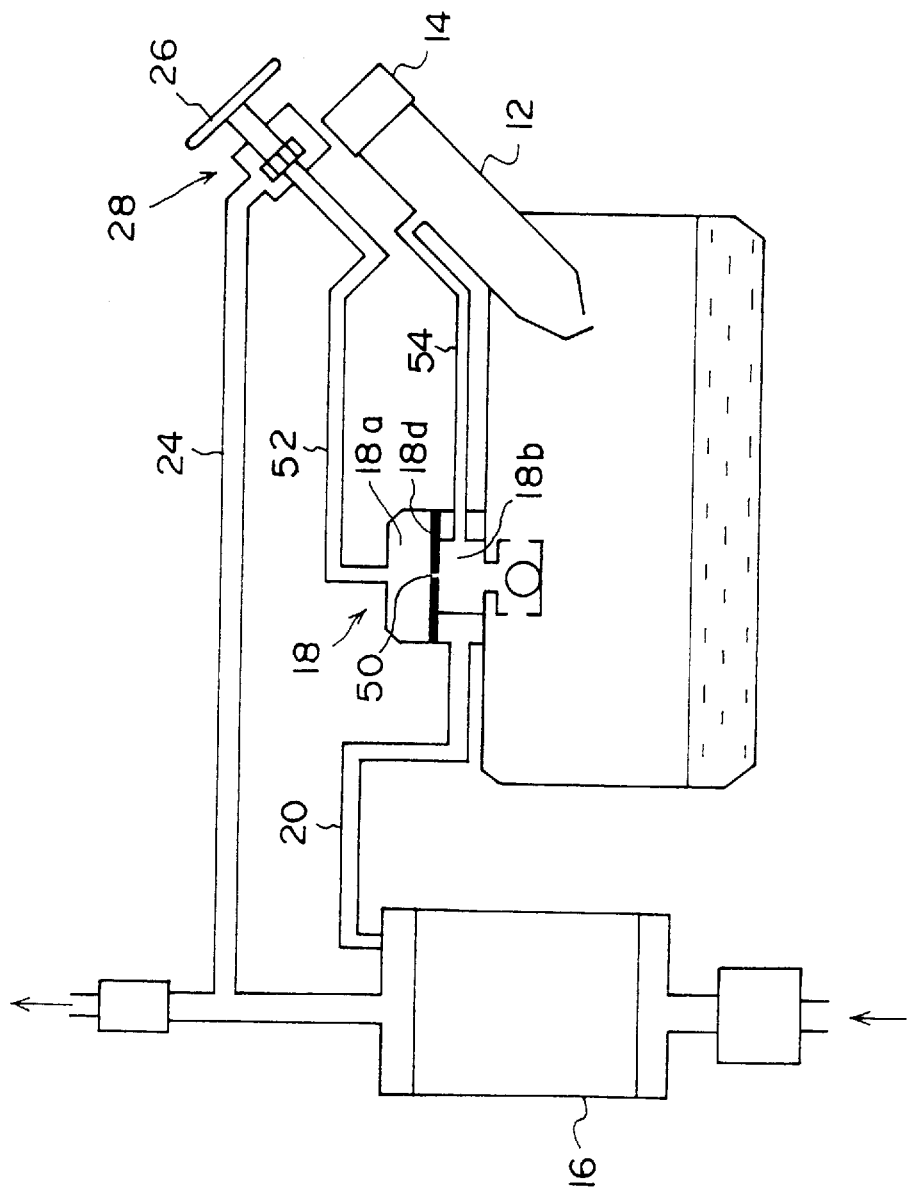
FIG. 5 is a schematic illustration showing a fuel vapor discharge preventing apparatus according to a second embodiment of the present invention.
Figure 6:
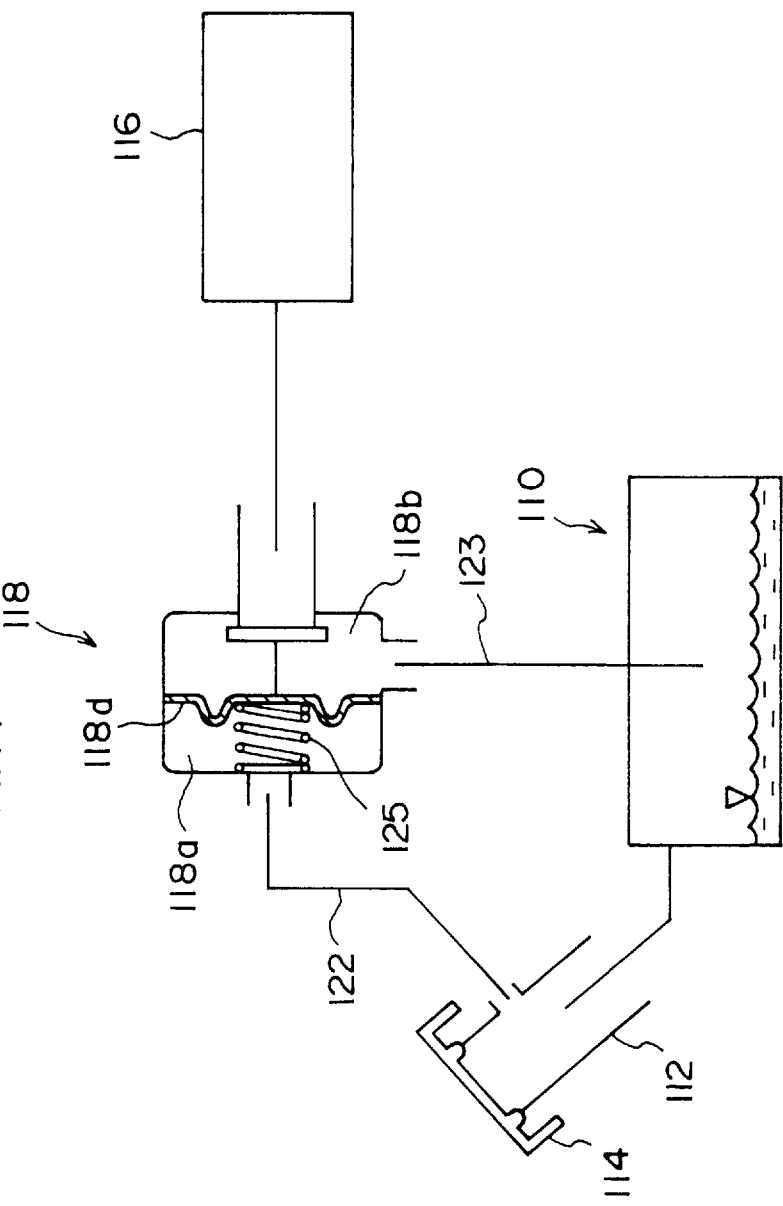
FIG. 6 is a schematic illustration showing a conventional fuel vapor discharge preventing apparatus.

FIGS. 1–5 show fuel vapor discharge preventing apparatuses according to embodiments of the present invention. FIG. 1 shows the overall structure of a fuel vapor discharge preventing apparatus according to the first embodiment. FIG. 2 shows the operation of the fuel vapor discharge preventing apparatus when a fuel lid is opened. FIG. 3 shows the flow characteristic of an atmospheric valve used in the fuel vapor discharge preventing apparatus. FIG. 4 shows the relationship between the pressure difference between the internal pressure of an inlet pipe and the atmospheric pressure and the amount of fuel vapor leaking from the fuel supply port of the inlet pipe. FIG. 5 shows a fuel vapor discharge preventing apparatus according to the second embodiment.

As shown in FIG. 1, a vehicle fuel tank 10 is provided with an inlet pipe 12 having a fuel supply port. A fuel cap 14 is attached to the fuel supply port of the inlet pipe 12 so as to close the fuel tank 10 in a sealed manner. Numeral 12a denotes a butterfly valve which prevents fuel from flowing back toward the fuel supply port during refueling. A canister 16 for processing fuel vapor produced within the fuel tank 10 is connected to the fuel tank 10 via a differential pressure valve 18 provided on the fuel tank 10 and a connection pipe 20 serving as a fuel vapor introducing passageway.

The lower pressure chamber 18a of the differential pressure valve 18 is connected to the inlet pipe 12 via a connection pipe 22 at a location in the vicinity of the fuel supply port so as to establish communication with the inlet pipe 12. The higher pressure chamber 18b of the differential pressure valve 18 is connected to the fuel tank 10 so as to establish communication therewith. Under the differential pressure valve 18, a float valve 18c is provided which rises with an increase in the level of the fuel so as to limit the level of the fuel.

The connection pipe 22 connecting the lower pressure chamber 18a of the differential pressure valve 18 and the inlet pipe 12 is connected to the canister 16 via a connection pipe 24 serving as a purge passageway, and a communication valve 28 which opens and closes with the operation of a fuel lid 26. The fuel lid 26 serves as a communication enabling member which opens the communication valve 28 before the fuel tank is opened to the atmosphere, thereby establishing communication through the connection pipe 24.

Numeral 30 denotes a purge flow control valve which controls suction force by which fuel vapor adsorbed by activated charcoal in the canister 16 is sucked by an unillustrated engine. Numeral 32 denotes an atmospheric valve which introduces air for sucking fuel vapor into the engine and releases the pressure inside the canister to the atmosphere when the internal pressure of the canister exceeds a predetermined level. The canister 16 is enclosed by the purge flow control valve 30, the atmospheric valve 32, the differential pressure valve 18 and the communication valve 28.

The operation of the fuel vapor discharge preventing apparatus during ordinary travel other than fueling will be described with reference to FIG. 1.

During ordinary travel, the fuel tank 10 is closed in a sealed manner by the fuel cap 14, and the lower pressure chamber 18a and the higher pressure chamber 18b of the differential pressure valve 18 communicate with each other. Therefore, the pressure in the lower pressure chamber 18a is the same as that in the higher pressure chamber 18b. Due to the elastic force of a diaphragm 18d of the differential pressure valve 18, the diaphragm 18d urges itself toward the fuel tank 10, so that the differential pressure valve 18 is closed so as to shut off the passageway connecting the fuel tank 10 and the canister 16.

When the engine runs, fuel vapor adsorbed by the activated charcoal in the canister 16 is sucked by an unillustrated intake manifold via the purge flow control valve 30, as indicated by arrow A in FIG. 1, and air is introduced via the atmospheric valve 32, as indicated by arrow B in FIG. 1. Thereby, the fuel vapor is then led into the engine to be processed therein.

When the engine is stopped after the ordinary travel, the purge flow control valve 30 is closed in response to, for example, a signal indicating the stoppage of the engine, whereby the suction by the intake manifold is stopped. When the fuel lid 26 is closed at this time, the communication valve 28 is also closed. Further, the atmospheric valve 32 closes when the pressure difference between the internal pressure of the canister 16 and the atmospheric pressure is negative, as shown by symbol P1 in FIG. 3. In FIG. 3, the axis of abscissa represents the pressure difference between the internal pressure of the canister 16 and the atmospheric pressure, and the axis of ordinate represents the flow rate of the atmospheric valve 32,.wherein flow in the direction indicated by arrow B in FIG. 1 is negative flow. The closed space including the inner space of the canister 16 which is enclosed by the differential pressure valve 18, the communication valve 28, the purge flow control valve 30, and the atmospheric valve 32 is maintained at a negative pressure even after the suction by the intake manifold is stopped. The internal pressure of the fuel tank 10 is normally positive for a short time after travel because of elevation of the fuel temperature.

When the fuel lid 26 is opened before refueling, as shown in FIG. 2, the communication valve 28 is opened via a mechanical connection with the fuel lid 26, so that the communication between the connection pipe 22 and the connection pipe 24 serving as a purge passageway is established. Namely, the lower pressure chamber 18a is communicated with the canister 16. Due to the above-mentioned negative pressure developed in the space including the inner space of the canister 16, fuel vapor in the lower pressure chamber 18a and fuel vapor in the area within the inlet pipe 12 in the vicinity of the fuel supply port are sucked by the canister 16 via the connection pipe 24, as shown by arrow C in FIG. 2.

At this time, the pressure of the lower pressure chamber 18a of the differential pressure valve 18 becomes lower than the internal pressure of the fuel tank 10, i.e., the internal pressure of the higher pressure chamber 18b, so that a pressure difference is produced in the differential pressure valve 18, and the diaphragm 18d is attracted toward the lower pressure chamber 18a. With this operation, the differential pressure valve 18 is opened so as to open the passageway connecting the fuel tank 10 and the canister 16. As a result, fuel vapor in the fuel tank 10 is led to the canister 16 via the connection pipe 20 serving as a fuel vapor introduction passageway, as shown by arrow D in FIG. 2.

Thus, since the internal pressure of the fuel tank 10 decreases from the positive pressure to a pressure close to the atmospheric pressure when the fuel cap 14 is removed, the fuel vapor is prevented from discharging from the fuel supply port of the inlet pipe 12. If the negative pressure capacity in the space including the canister 16 is maintained such that the pressure difference between the internal pressure of the inlet pipe 12 and the atmospheric pressure becomes smaller than P0 shown in FIG. 4 when the fuel cap 14 is removed, fuel vapor in the fuel tank does not discharge through the inlet pipe 12. In FIG. 4, the axis of abscissa represents the pressure difference between the internal pressure of the inlet pipe 12 and the atmospheric pressure, and the axis of ordinate represents the amount of fuel vapor leaking from the fuel supply port. Since the inlet pipe 12 has a flow resistance, the leakage of fuel vapor can be prevented even when the internal pressure of the inlet pipe 12 is higher than the atmospheric pressure by an amount of up to P0.

In cases where fuel vapor discharges from the fuel supply port of the inlet pipe 12 due to an insufficient negative pressure capacity of a space including the canister 16, the connection pipes 22, 24, and the lower pressure chamber 18a, a space section 34 (see FIG. 7) may be provided in the middle of the connection pipe 24 to provide a sufficient negative pressure capacity, or the opening pressure P1 of the atmospheric valve 32 may be lowered to provide a sufficient negative pressure capacity.

In cases where the internal pressure of the fuel tank 10 increases excessively due to an increase in the fuel temperature and a long period of time is therefore needed to lead fuel vapor produced in the fuel tank 10 to the canister 16, the fuel tank 10 may be connected to the connection pipe 20 via a relief valve 36 (see FIG. 7), and the opening pressure of the relief valve may be adjusted in advance to maintain the internal pressure of the fuel tank 10 at a predetermined low level. In this case, fuel vapor can be quickly led to the canister 16 when the fuel lid 26 is opened.

The connection pipe 24 serving as a purge passageway and the connection pipe 22 can have small diameters insofar as they can allow the creation of a pressure difference between the lower pressure chamber 18a and the high pressure chamber 18b of the differential pressure valve 18. Accordingly, even when the connection pipe 24 is in a closed state during refueling due to a malfunction of the communication valve 28, the differential pressure valve 18 opens due to an increase in the internal pressure of the fuel tank 10 which occurs as the level of fuel rises, whereby fuel vapor produced in the fuel tank 10 is led to the canister 16 via the connection pipe 20 having a diameter larger than those of the connection pipes 24 and 22.

FIG. 5 shows a fuel vapor discharge preventing apparatus according to the second embodiment of the present invention. A description for the portions identical to those of the fuel vapor discharge preventing apparatus of the first embodiment will be omitted. Also, a description for part of the operation during the opening of the fuel lid which is equivalent to that of the operation in the first embodiment will be omitted.

As shown in FIG. 5, a small aperture 50 is formed in the diaphragm 18d of the differential pressure valve 18, so that the lower pressure chamber 18a and the high pressure chamber 18b of the differential pressure valve 18 communicate with each other through the aperture 50. The lower pressure chamber 18a of the differential pressure valve 18 is connected to the canister 16 via a connection pipe 52, the above-mentioned connection valve 28 and the connection pipe 24 serving as a purge passageway. Further, the portion of the inlet pipe 12 near the fuel supply port is connected to the lower pressure chamber 18a via the aperture 50 and a connection pipe 54.

As described above, when the fuel lid 26 is opened before refueling, the communication valve 28 is opened via a mechanical connection with the fuel lid 26. As a result, the communication between the connection pipe 52 and the connection pipe 24 serving as a purge passageway is established so as to allow the lower pressure chamber 18a of the differential pressure valve 18 to communicate with the canister 16. Due to the a negative pressure developed in the canister 16, fuel vapor in the lower pressure chamber 18a are sucked by the canister 16 via the connection pipe 24.

At this time, due to the flow resistance of the aperture 50 formed in the diaphragm 18d, the amount of fuel vapor flowing from the fuel tank 10 to the lower pressure chamber 18a of the differential pressure valve 18 via the aperture 50 is smaller than the amount of fuel vapor led from the lower pressure chamber 18a to the canister 16. Therefore, a pressure difference is produced between the lower pressure chamber 18a and the high pressure chamber 18b of the differential pressure valve 18, so that the differential pressure valve 18 opens, as described above. As a result, fuel vapor produced in the fuel tank 10 is led to the canister 16 via the connection pipe 20. Also, fuel vapor in the portion of the inlet pipe 12 near the fuel supply port is led to the canister 16 via the connection pipe 54 and the high pressure chamber 18b of the differential pressure valve 18. If the negative pressure capacity of the canister 16 is sufficient, the internal pressures of the fuel tank 10 and the inlet pipe 12 decrease, as described above, and fuel vapor is prevented from discharging from the fuel supply port of the inlet pipe 12 which would otherwise occur when the fuel cap 14 is removed.

Also, the connection pipe 54 serves to return part of fuel vapor produced in the fuel tank 10 during refueling to the fuel supply port of the inlet pipe 12. That is, since a negative pressure is developed in the fuel supply port of the inlet pipe 12 during refueling due to the flow of fuel, outside air may be sucked into the fuel tank 10. However, since part of fuel vapor produced in the fuel tank 10 is returned to the fuel supply port of the inlet pipe 12 via the connection pipe 54, fuel vapor is sucked into the fuel tank 10 instead of outside air. This decreases the amount of outside air flowing from the outside of the fuel supply port into the inlet pipe 12, thereby decreasing the amount of fuel vapor produced due to introduction of air. As a result, the amount of activated charcoal in the canister 16 and the size of the canister 16 can be reduced.

When the connection pipes used in the first and second embodiments are disposed such that they run near a heat source (for example, an exhaust pipe) in a vehicle, the liquefaction of fuel vapor within the connection pipes can be prevented, so that the connection pipes are prevented from being clogged by the liquid fuel. This guarantees smooth opening/closing operation of the differential pressure valve.

Figure 7:
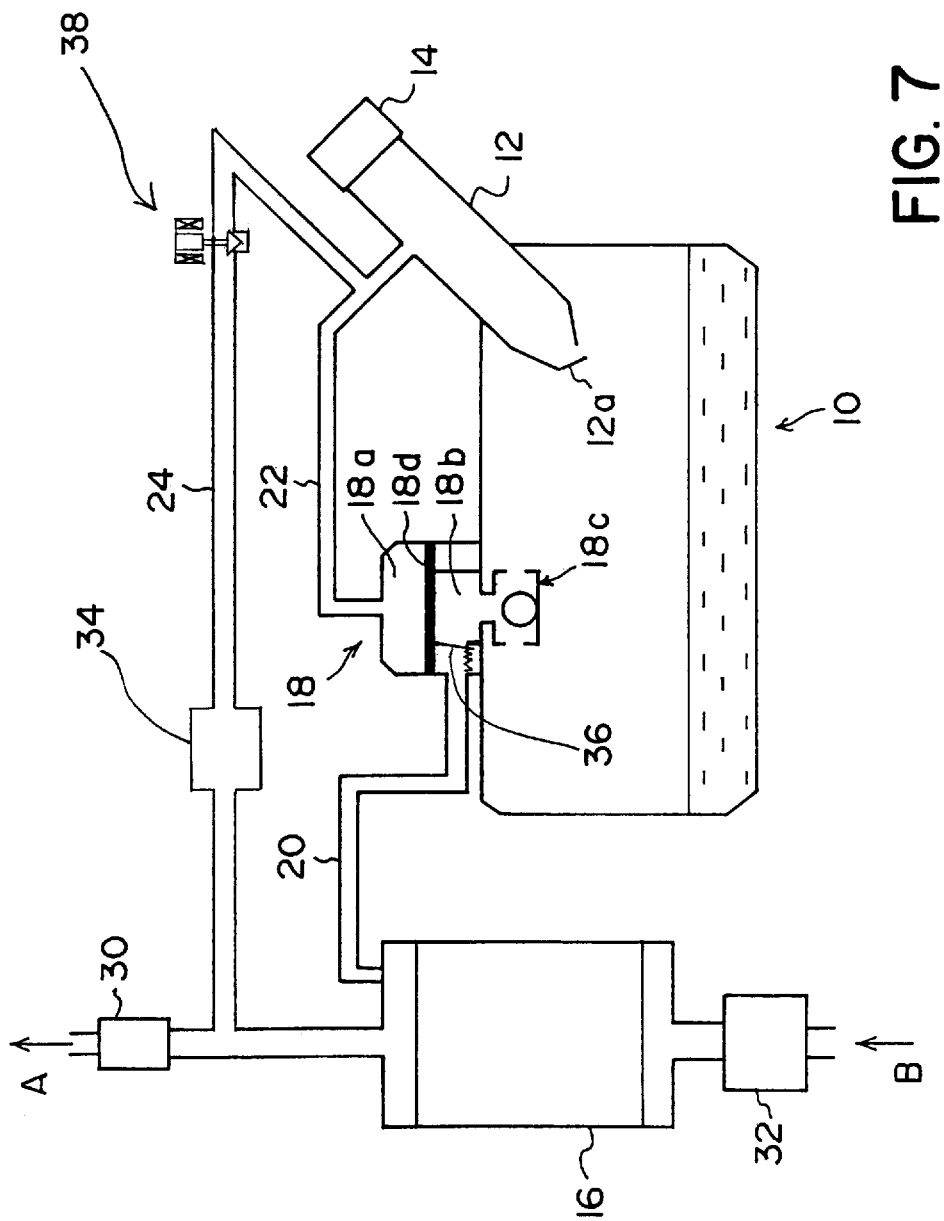
FIG. 7 is a schematic illustration showing a fuel vapor discharge apparatus according to a third embodiment of the present invention.

In the above-described embodiments, a fuel lid serving as a communication enabling member is utilized to open the communication valve before the fuel supply port of the fuel tank is opened to the atmosphere, thereby establishing communication through the purge passageway. However, as shown in FIG. 7, it is possible to use an electromagnetic valve 38 as the communication valve and to open the electromagnetic valve in response to a signal indicating the stoppage of the engine so as to establish communication through the purge passageway.

In the above-described embodiments, the internal pressure of the canister is made negative after travel. However, the internal pressure of the canister may be equal to the atmospheric pressure after travel, if fuel vapor in the lower pressure chamber of the differential pressure valve can be led to the canister when the purge passageway is opened, thereby producing a pressure difference in the differential pressure valve to open the differential pressure valve.

In the fuel vapor discharge preventing apparatus according to the present invention, before the fuel supply port of the fuel tank is opened to the atmosphere, the communication valve is opened by a communication enabling member so as to open the purge passageway. As a result, fuel vapor in the lower pressure chamber of the differential pressure valve is led to the canister via the purge passageway, and a pressure difference is produced between the lower pressure chamber and the higher pressure chamber of the differential pressure valve, so that the differential pressure valve is opened to establish communication through the fuel vapor introducing passageway, thereby leading fuel vapor from the fuel tank to the canister. Accordingly, it is possible to prevent fuel vapor in the lower pressure chamber of the differential pressure valve from being discharged to the atmosphere, thereby preventing air pollution.

Also, even when the communication valve is broken, the differential pressure valve opens to lead fuel vapor produced in the fuel tank to the canister via the differential pressure valve for processing the same in the canister.

While the embodiments of the present invention, as herein disclosed, constitute a preferred form, it is to be understood that other forms might be adopted.

What is claimed is:

1. An apparatus for preventing discharge of fuel vapor comprising:

a fuel tank for a vehicle;

a fuel cap for closing said fuel tank in a sealed manner;

a canister for processing fuel vapor produced in said fuel tank;

a fuel vapor introducing passageway for connecting said fuel tank and said canister;

a differential pressure valve disposed in the middle of said fuel vapor introducing passageway so as to open and close said fuel vapor introducing passageway, a lower pressure chamber of said differential pressure valve communicating with said fuel tank at a position in the vicinity of the fuel supply port thereof, and a high pressure chamber of said differential pressure valve communicating with said fuel tank;

a purge passageway connecting the lower pressure chamber of said differential pressure valve and said canister;

a communication valve disposed in the middle of said purge passageway and adapted to selectively open said purge passageway; and a communication enabling member for opening said communication valve, before said fuel tank opens to the atmosphere due to removal of said fuel cap, thereby establishing communication through said purge passageway.

2. An apparatus for preventing discharge of fuel vapor according to claim 1, wherein said communication enabling member is a fuel lid.

3. An apparatus for preventing discharge of fuel vapor according to claim 1, wherein a movable valve member of said differential pressure valve is a diaphragm present between the high pressure chamber and the lower pressure chamber of said differential pressure valve.

4. An apparatus for preventing discharge of fuel vapor according to claim 1, wherein said fuel vapor introducing passageway has a diameter greater than that of said purge passageway.

5. An apparatus for preventing discharge of fuel vapor according to claim 1, wherein said fuel vapor introducing passageway and said purge passageway are disposed in the vicinity of a heat source in the vehicle.

6. An apparatus for preventing discharge of fuel vapor according to claim 1, wherein a space section is provided in the middle of said purge passageway to ensure sufficient negative pressure capacity of a space including said canister.

7. An apparatus for preventing discharge of fuel vapor according to claim 1, wherein a relief valve is provided at a position of said fuel vapor introducing passageway between said differential pressure valve and said canister to connect said fuel tank and said canister when the internal pressure of said fuel tank increases excessively.

8. An apparatus for preventing discharge of fuel vapor according to claim 1, wherein said communication valve is an electromagnetic valve which is opened to establish communication through said purge passage, and said communication enabling member outputs to said electromagnetic valve a command for opening said electromagnetic valve based on a signal indicating a stoppage of the engine.

9. An apparatus for preventing discharge of fuel vapor comprising:

a fuel tank for a vehicle;

a fuel cap for closing said fuel tank in a sealed manner;

a canister for processing fuel vapor produced in said fuel tank;

a fuel vapor introducing passageway for connecting said fuel tank and said canister;

a differential pressure valve disposed in the middle of said fuel vapor introducing passageway so as to open and close said fuel vapor introducing passageway, a lower pressure chamber of said differential pressure valve communicating with said fuel tank at a position in the vicinity of the fuel supply port thereof, and a high pressure chamber of said differential pressure valve communicating with said fuel tank;

a purge passageway connecting the lower pressure chamber of said differential pressure valve and said canister;

a communication valve disposed in the middle of said purge passageway and adapted to selectively open said purge passageway; and a fuel lid for opening said communication valve, before said fuel tank opens to the atmosphere due to removal of said fuel cap, thereby establishing communication through said purge passageway, wherein said fuel vapor introducing passageway has a diameter greater than that of said purge passageway.

10. An apparatus for preventing discharge of fuel vapor according to claim 9, wherein said fuel vapor introducing passageway and said purge passageway are disposed in the vicinity of a heat source in the vehicle.

11. An apparatus for preventing discharge of fuel vapor according to claim 9, wherein a space section is provided in the middle of said purge passageway to ensure sufficient negative pressure capacity of a space including said canister.

12. An apparatus for preventing discharge of fuel vapor according to claim 9, wherein a relief valve is provided at a position of said fuel vapor introducing passageway between said differential pressure valve and said canister to connect said fuel tank and said canister when the internal pressure of said fuel tank increases excessively.

13. An apparatus for preventing discharge of fuel vapor comprising:

a fuel tank for a vehicle;

a fuel cap for closing said fuel tank in a sealed manner;

a canister for processing fuel vapor produced in said fuel tank;

a fuel vapor introducing passageway for connecting said fuel tank and said canister;

a differential pressure valve disposed in the middle of said fuel vapor introducing passageway so as to open and close said fuel vapor introducing passageway;

a purge passageway connecting a lower pressure chamber of said differential pressure valve and said canister;

a communication valve disposed in the middle of said purge passageway and adapted to selectively open said purge passageway; and a communication enabling member for opening said communication valve, before said fuel tank opens to the atmosphere due to removal of said fuel cap, thereby establishing communication through said purge passageway, wherein a small aperture is provided in a movable valve member of said differential pressure valve to connect the lower pressure chamber and a high pressure chamber of said differential pressure valve, and the lower pressure chamber of said differential pressure valve communicates with said fuel tank at a position in the vicinity of the fuel supply port thereof via said aperture, while the high pressure chamber of said differential pressure valve communicates with said fuel tank.

14. An apparatus for preventing discharge of fuel vapor according to claim 13, wherein said communication enabling member is a fuel lid.

15. An apparatus for preventing discharge of fuel vapor according to claim 13, wherein the movable valve member of said differential pressure valve is a diaphragm present between the high pressure chamber and the lower pressure chamber of said differential pressure valve, and said small aperture is formed at the center of said diaphragm.

16. An apparatus for preventing discharge of fuel vapor according to claim 13, wherein said fuel vapor introducing passageway has a diameter greater than that of said purge passageway.

17. An apparatus for preventing discharge of fuel vapor according to claim 13, wherein said fuel vapor introducing passageway and said purge passageway are disposed in the vicinity of a heat source in the vehicle.

18. An apparatus for preventing discharge of fuel vapor according to claim 13, wherein a space section is provided in the middle of said purge passageway to ensure sufficient negative pressure capacity of a space including said canister.

19. An apparatus for preventing discharge of fuel vapor according to claim 13, wherein a relief valve is provided at a position of said fuel vapor introducing passageway between said differential pressure valve and said canister to connect said fuel tank and said canister when the internal pressure of said fuel tank increases excessively.

20. An apparatus for preventing discharge of fuel vapor according to claim 13, wherein said communication valve is an electromagnetic valve which is opened to establish communication through said purge passage, and said communication enabling member outputs to said electromagnetic valve a command for opening said electromagnetic valve based on a signal indicating a stoppage of the engine.

* * * * *